United States Patent
Kim et al.

(10) Patent No.: US 8,513,355 B2
(45) Date of Patent: Aug. 20, 2013

(54) GRAFT COPOLYMER IMPROVING ADHESION RESISTANCE AND IMPACT STRENGTH, METHOD OF PREPARING THE SAME, AND PVC COMPOSITION COMPRISING THE SAME

(75) Inventors: Yoon Ho Kim, Yeosu-si (KR); Geon Soo Kim, Daejeon (KR); Yeon Hwa Wi, Yeosu-si (KR); Ki Hyun Yoo, Seoul (KR); Chan Hong Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 235 days.

(21) Appl. No.: 12/870,479

(22) Filed: Aug. 27, 2010

(65) Prior Publication Data

US 2011/0244240 A1    Oct. 6, 2011

(30) Foreign Application Priority Data

Mar. 30, 2010 (KR) .................. 10-2010-0028702
Jul. 9, 2010 (KR) .................. 10-2010-0066330

(51) Int. Cl.
*C08L 51/04* (2006.01)
*B32B 5/00* (2006.01)

(52) U.S. Cl.
USPC ............... 525/83; 525/70; 525/79; 525/243; 525/303; 525/312; 525/902

(58) Field of Classification Search
USPC ............... 525/70, 79, 80, 83, 86, 242, 243, 525/298, 302, 303, 312, 902
See application file for complete search history.

(56) References Cited

U.S. PATENT DOCUMENTS 3,671,610 A * 6/1972 Amagi et al. ............ 525/79
3,775,514 A * 11/1973 Amagi et al. ............ 525/84

* cited by examiner

*Primary Examiner* — Irina S Zemel
*Assistant Examiner* — Jeffrey Lenihan
(74) *Attorney, Agent, or Firm* — McKenna, Long & Aldridge, LLP

(57) ABSTRACT

Disclosed is a graft copolymer highly improving the adhesion resistance and impact strength, a method of preparing the same, and PVC composition containing the same, wherein the graft copolymer comprises i) 55 to 85 wt % of a conjugated diene-based rubber core; and ii) 15 to 45 wt % of a graft shell surrounding the rubber core, and formed by comprising a (meth)acrylate-based monomer, and at least one selected from the group consisting of a vinyl-based monomer having a polyalkylene oxide group represented by the following Formula 1; in which the graft copolymer includes 0.1 to 5 wt % of the vinyl-based monomer having the polyalkylene oxide group represented by the following Formula 1:

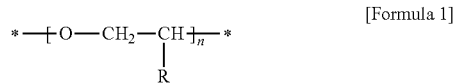

[Formula 1]

wherein
R is independently hydrogen, or $C_1$ to $C_4$ alkyl group, and n is independently 3 to 14.

11 Claims, No Drawings

GRAFT COPOLYMER IMPROVING ADHESION RESISTANCE AND IMPACT STRENGTH, METHOD OF PREPARING THE SAME, AND PVC COMPOSITION COMPRISING THE SAME

CROSS-REFERENCE(S) TO RELATED APPLICATIONS

This application claims priority from Korean Patent Applications Nos. 10-2010-0028702 and 10-2010-0066330, filed on Mar. 30, 2010 and Jul. 9, 2010, respectively, in the Korean Intellectual Property Office, the disclosure of which is incorporated herein by reference in its entirety.

TECHNICAL FIELD

The present invention relates to a graft copolymer improving adhesion resistance and impact strength, a method of preparing the same, and PVC composition containing the same, and more specifically to a graft copolymer highly improving adhesion resistance, an impact strength, and the like, a method of preparing the same, and a polyvinyl chloride composition containing the same, which has an excellent adhesion resistance, an impact strength, and the like.

BACKGROUND OF THE INVENTION

A polyvinyl chloride (PVC) is general purpose resin that is widely used in various fields, due to its excellent physical and chemical properties. However, a processing temperature of the polyvinyl chloride is close to a pyrolysis temperature, so that a range of a moldable temperature of the polyvinyl chloride is narrow. In addition, the polyvinyl chloride has a high melt viscosity and a low flowability, so that when processing, the carbide is formed by being adhered on a surface of processing equipment, so there is a problem that the carbide causes a deterioration of a quality of a final product.

Therefore, there have been many attempts to improve a processability of the polyvinyl chloride, such as a change of its monomer compositions, a regulation of its molecular weight, a change of its structure, or a change of graft polymerization method, and the like for a methylmethacrylate-butadiene-styrene-based graft copolymer which has been used as an impact modifier of the prior polyvinyl chloride.

However, the aforementioned attempts have a limit in improving the processability, such as the adhesion resistance, the flowability, and the like, and even if the processability is improved, there are the problems that a physical property, such as a transparency, impact resistance strength, and the like, are deteriorated.

As another process for improving the processability, there is a process to prevent an adhesion with the processing equipment and improve the flowability by adding a lubricant. However, there are problems that the lubricant has a low compatibility with a polymer, and a behavior of the lubricant is unpredictable when applying it in a plant.

Therefore, the impact modifier that can improve the adhesion resistance, the impact resistance, an optical property, and the like of the PVC resin when processing is urgently needed.

SUMMARY OF THE INVENTION

To solve the above-mentioned problems, an object of the present invention is to provide a graft copolymer highly improving the adhesion resistance and the impact strength, a method of preparing the same, and a polyvinyl chloride composition containing the same, in which the polyvinyl chloride composition has an excellent adhesion resistance, impact strength, and the like.

The above-mentioned object and other object of the present invention can be achieved through the present invention described as follows.

To achieve the above objects, the present invention provides a graft copolymer and a method of preparing the same, in which the graft copolymer comprises i) 55 to 85 wt % of a conjugated diene-based rubber core, and ii) 15 to 45 wt % of a graft shell surrounding the rubber core, and being formed by comprising a (meth)acrylate-based monomer, and at least one selected from the group consisting of a vinyl-based monomer having a polyalkylene oxide group represented by the following Formula 1;

in which the graft copolymer comprises 0.1 to 5 wt % of the vinyl-based monomer having the polyalkylene oxide group represented by the following Formula 1:

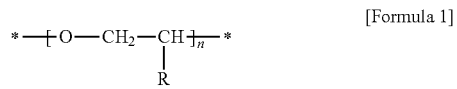

[Formula 1]

wherein
R is independently hydrogen, or $C_1$ to $C_4$ alkyl group and n is independently 3 to 14.

In addition, the present invention provides PVC composition containing the graft copolymer, which has an excellent adhesion resistance and the impact strength.

DETAILED DESCRIPTION OF THE INVENTION

Hereinafter, the present invention will be described in more detail.

A graft copolymer of the present invention comprises i) 55 to 85 wt % of a conjugated diene-based rubber core, and ii) 15 to 45 wt % of a graft shell surrounding the rubber core, and being formed by comprising a (meth)acrylate-based monomer, and at least one selected from the group consisting of a vinyl-based monomer having a polyalkylene oxide group represented by the following Formula 1;

in which the graft copolymer comprises 0.1 to 5 wt % of the vinyl-based monomer having the polyalkylene oxide group represented by the following Formula 1:

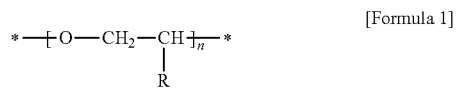

[Formula 1]

wherein
R is independently hydrogen, or $C_1$ to $C_4$ alkyl group and n is independently 3 to 14.

The vinyl-based monomer having [the polyalkylene oxide group represented by the above Formula 1] is preferably a monomer having at least one vinyl group.

The conjugated diene-based rubber is preferably a rubber consisting of at least one monomer selected from the group consisting of a butadiene, an isoprene, a chloroisoprene, and the like, and may be composed by further comprising an ethylene-unsaturated aromatic monomer.

The above ethylene-unsaturated aromatic monomer may be at least one selected from the group consisting of styrene, alpha-methylstyrene, isopropenyl naphthalene, vinyl naphthalene, styrene in which at least one hydrogen of benzene ring is substituted with $C_1$ to $C_3$ alkyl group, and a styrene in which at least one hydrogen of the benzene ring is substituted with halogen.

The conjugated diene-based rubber may further comprise a crosslinking monomer.

The crosslinking monomer is preferably at least one selected from the group consisting of a divinylbenzene, an ethylene glycol dimethacrylate, a diethylene glycol dimethacrylate, a triethylene glycol dimethacrylate, a 1,3-butylene glycol dimethacrylate, an arylmethacrylate, a 1,3-butylene glycol diacrylate, and the like.

The crosslinking monomer is preferably included in the amount of less than 0.1 to 5 wt %, and more preferably in the amount of less than 0.1 to 2 wt %, based on the conjugated diene-based rubber, because there is an effect that the impact strength within the range is excellent.

The conjugated diene-based rubber can be prepared through one or more reaction step, but monomer compositions at each step are not specially limited.

The graft shell may be formed by further comprising up to 40 wt % of the ethylene-unsaturated aromatic monomer based on total 100 wt % of the graft shell. When the amount of the graft shell exceeds 40 wt %, there is a problem that the compatibility of the produced MBS-based graft copolymer with PVC resin is largely decreased.

In order to use the graft copolymer produced by using the graft shell for a transparency, a refractive index of the graft shell needs to be increased. To achieve this, the graft copolymer may be prepared by further comprising the polymerization of the graft that includes the ethylene-unsaturated aromatic monomer, in addition to the polymerization of the graft that includes the (meth)acrylate-based monomer, and at least one selected from the group consisting of the vinyl-based monomer having the polyalkylene oxide group represented by the above Formula 1. In the process, preferably, the amount of the additional ethylene-unsaturated aromatic monomer is the level such that the refractive index of the obtained graft copolymer is the same with the refractive index of PVC resin.

Therefore, the graft shell may be comprise a first graft layer comprising the (meth)acrylate-based monomer, and at least one selected from the group consisting of the vinyl-based monomer having the polyalkylene oxide group represented by the above Formula 1; and a second graft layer comprising the ethylene-unsaturated aromatic monomer.

The vinyl-based monomer having the polyalkylene oxide group represented by the above Formula 1 may specifically be poly(ethylene glycol)monoacrylate, poly(ethylene glycol) monomethacrylate, poly(propylene glycol)monoacrylate or poly(propylene glycol)monomethacrylate, poly(ethylene glycol)diacrylate, poly(ethylene glycol)dimethacrylate, poly (propylene glycol)diacrylate, poly(propylene glycol) dimethacrylate, methoxy poly(ethylene glycol)monoacrylate, methoxy poly(ethylene glycol)monomethacrylate, methoxy poly(propylene glycol)monoacrylate, methoxy poly (propylene glycol)monomethacrylate, phenoxy poly(ethylene glycol)monoacrylate, or phenoxy poly(ethylene glycol) monomethacrylate, and the like.

A number average molecular weight (Mn) of the vinyl-based monomer having the polyalkylene oxide group represented by the above Formula 1 may be 200 to 10,000.

For reference, a polyethylene glycol methacrylate (PEGMA) having the following structure is used in Example:

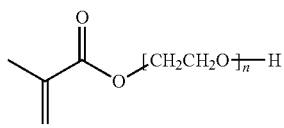

wherein, n is 6, and a number average molecular weight (Mn) is 360.

The (meth)acrylate-based monomer may be an alkyl methacrylate or an alkyl acrylate, and preferably may be at least one selected from the group consisting of a methyl methacrylate, an ethyl methacrylate, a butyl methacrylate, a methyl acrylate, an ethyl acrylate, and a butyl acrylate, and the like.

The above ethylene-unsaturated aromatic monomer is preferably at least one selected from the group consisting of styrene, alpha-methylstyrene, isoprophenylnaphtalene, vinyl naphthalene, a $C_1$ to $C_3$ alkyl group-substituted styrene, and a halogen-substituted styrene, and the like.

The graft copolymer preferably includes 55 to 85 wt % of the butadiene rubber core, 0.1 to 5 wt % of at least one selected from the group consisting of the vinyl-based monomer having the polyalkylene oxide group represented by the above Formula 1, and 10.0 to 44.9 wt % of the total weight of the (meth)acrylate-based monomer, or the (meth)acrylate-based monomer and the ethylene-unsaturated aromatic monomer. There is an effect that PVC composition comprising the above graft copolymer being prepared within the above range as the impact modifier has an excellent adhesion resistance, impact strength, and the like.

The graft copolymer more preferably comprises 55 to 85 wt % of the butadiene rubber core, 0.2 to 2.0 wt % of at least one selected from the group consisting of the vinyl-based monomer having the polyalkylene oxide group represented by the above Formula 1, and 13.0 to 44.9 wt % of the total weight of the (meth)acrylate-based monomer, or the (meth) acrylate-based monomer and the ethylene-unsaturated aromatic monomer.

The graft copolymer is preferably used as the impact modifier for the polyvinyl chloride.

A method of preparing the graft copolymer according to the present invention comprises a) polymerizing the conjugated diene-based rubber core; and b) preparing the graft shell by introducing the (meth)acrylate-based monomer, and at least one selected from the group consisting of the vinyl-based monomer having the polyalkylene oxide group represented by the following Formula 1 to the polymerized rubber core, and then graft-polymerizing; in which the graft copolymer comprises 55 to 85 wt % of the polymerized rubber core, 15 to 45 wt % of the graft shell prepared by comprising the (meth)acrylate-based monomer, and at least one selected from the group consisting of the vinyl-based monomer having the polyalkylene oxide group represented by the following Formula 1, and 0.1 to 5 wt % of the vinyl-based monomer having the polyalkylene oxide group represented by the following Formula 1:

[Formula 1]

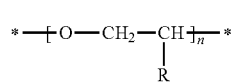

wherein

R is independently hydrogen, or $C_1$ to $C_4$ alkyl group and n is independently 3 to 14.

The method of preparing the graft copolymer according to the present invention includes all of the content regarding the graft copolymer according to the present invention.

In addition, the method of preparing the graft copolymer further comprises preparing a second graft shell by introducing a styrene-based monomer to the graft shell prepared as mentioned above (hereinafter, be called as a first graft shell), and graft polymerizing as necessary. The graft copolymer prepared as mentioned above may have a suitable physical property to be used as the impact modifier for a transparency.

The polymerization of a) or the graft polymerizations of b) may be an emulsion polymerization, but is not limited thereto. In addition, a reaction condition, a reaction medium, an emulsifier, an initiator, and the like, may be selected and regulated within a typical range, and the graft polymerization may be composed of at least two polymerization steps.

The polyvinyl chloride (PVC) resin composition according to the present invention with an excellent adhesion resistance and impact strength is characterized in that comprises 1 to 20 wt % of the graft copolymer and 80 to 99 wt % of the polyvinyl chloride resin.

The PVC resin composition may include an antioxidant, a heat stabilizer, a plasticizer, a coloring agent, a lubricant, and the like known in the fields of the present invention as necessary.

Hereinafter, the present invention will be described in more details with reference to the following Examples, in order to help understand of the present invention. While the present invention has been shown and described in connection with the exemplary embodiments, it will be apparent to those skilled in the art that modifications and variations can be made without departing from the spirit and scope of the invention as defined by the appended claims.

EXAMPLES

Example 1

<Preparation of Conjugated Diene-Based Rubber Latex>

A percentage by weight of the following compounds refers to the standard of 100 wt % of the total monomers being used for preparing the conjugated diene-based rubber latex, and a part by weight refers to the standard of 100 parts by weight of the total monomers.

150 parts by weight of an ion-exchanged water, 0.5 parts by weight of a buffer solution, 2.0 parts by weight of a potassium oleate, 0.0047 parts by weight of an ethylenediamine tetrasodium acetate, 0.003 parts by weight of a ferrous sulfate, 0.02 parts by weight of a sodium formaldehyde sulphoxylate, and 0.1 parts by weight of a diisopropylbenzene hydroperoxide, as additives, were early added to a high-pressure polymerization vessel 120 L equipped with an agitator. Conjugated diene-based rubber latex was obtained by introducing 75 wt % of a butadiene, 24 wt % of a styrene, and 1 wt % of a divinylbenzene to the above vessel, and then polymerizing them during 18 hrs at 50° C. At this point, a final polymerization conversion rate was 98%, and an average particle size was 100 nm.

<Preparation of Graft Copolymer Latex>

A percentage by weight of the following compounds refers to the standard of 100 wt % of the total weight of monomers added newly, and the conjugated diene-based rubber latex used for preparing the graft copolymer, and a part by weight refers to the standard of 100 parts by weight of the total weight of the conjugated diene-based rubber latex and monomers added newly.

After 70 wt % of the obtained conjugated diene-based rubber latex based on the solid was introduced to a closed reactor, nitrogen was filled into the reactor. After 0.0094 wt % of the ethylenediamine tetrasodium acetate, 0.006 parts by weight of the ferrous sulfate, and 0.04 parts by weight of a sodium formaldehyde sulphoxylate were introduced into the reactor as mentioned above, 14 wt % of the methylmethacrylate, 1 wt % of the polyethylene glycol methacrylate (PEGMA; n=6, Mn=360), 0.15 parts by weight of the potassium oleate, 15 parts by weight of the ion-exchanged water, and 0.05 parts by weight of the t-butyl hydroperoxide were added for 10 mins, and then polymerized for 2 hrs at 60° C. Subsequently, 15 wt % of the styrene, 0.0094 parts by weight of the ethylenediamine tetrasodium acetate, 0.006 parts by weight of the ferrous sulfate, 0.04 parts by weight of the sodium formaldehyde sulphoxylate, 0.15 parts by weight of the potassium oleate, 15 parts by weight of the ion-exchanged water, and 0.05 parts by weight of the t-butyl hydroperoxide were introduced, and then polymerized for 2 hrs at 60° C. to prepare the graft copolymer latex.

<Preparation of Graft Copolymer Powder>

While 0.5 parts by weight of the antioxidant (Irganox-245) was added to 100 parts by weight of the graft copolymer obtained as latex, and stirred, aqueous sulfuric acid solution was added and condensed, and then separated to be a copolymer and water at 70° C. Subsequently, a graft copolymer powder was produced by dehydrating and drying.

<Preparation of PVC Resin Composition Sheet>

A PVC resin master batch was prepared and was used for preparing a sheet of PVC resin composition in order to easily process. The PVC resin master batch was prepared by fully mixing 100 parts by weight of a PVC resin, 1.5 parts by weight of the heat stabilizer (Sn stearate), 1.0 parts by weight of an internal lubricant (calcium stearate), 0.3 parts by weight of an external lubricant (paraffin wax), 0.5 parts by weight of a processing aid (LG Chemical, PA-910), and 0.3 parts by weight of a pigment at 130° C. using a high speed agitator and then cooling.

7 parts by weight of the graft copolymer powder was added to the PVC resin master batch obtained to prepare the sheet with 0.5 mm thickness in order to be measured the impact strength using a roll of 195° C.

Example 2

The Example 2 was performed by the same method as Example 1, except that 14.8 wt % of the methylmethacrylate and 0.2 wt % of the polyethylene glycol methacrylate (PEGMA) were added.

Comparative Example 1

The Comparative Example 1 was performed by the same method as Example 1, except that 15 wt % of the methylmethacrylate was added and the polyethylene glycol methacrylate (PEGMA) was not added.

Comparative Example 2

The Comparative Example 2 was performed by the same method as Example 1, except that 15 wt % of the methylmethacrylate was added, the polyethylene glycol methacrylate (PEGMA) was not added, and 1 part by weight of the polyethylene glycol (PEG) was introduced to the graft copolymer obtained of the latex state and then condensed.

Comparative Example 3

The Comparative Example 3 was performed by the same method as Example 1, except that 50 wt % of the conjugated diene-based rubber latex based on the solid was added when preparing the graft copolymer latex, 24 wt % of the methylmethacrylate was added, and 25 wt % of the styrene was added.

Comparative Example 4

The Comparative Example 4 was performed by the same method as Example 1, except that 90 wt % of the conjugated diene-based rubber latex based on the solid was added when preparing the graft copolymer latex, 4 wt % of the methylmethacrylate was added, and 5 wt % of the styrene was added.

Comparative Example 5

The PVC sheet was prepared only with the PVC resin master batch of Example 1.

Test Example

Properties of the PVC composition sheets in Examples 1 to 3 and Comparative Examples 1 to 6 were measured using the following method, and the results were shown in the following Table 1.

Adhesion resistance: After mixing of the obtained graft copolymer with the PVC master batch, sheets lengths after processing for 2 mins and 5 mins in the roll mill of 200° C. were measured, respectively, and then estimated with the calculated value (%) from (sheet length after processing for 5 mins)÷(sheet length after processing for 2 mins)×100. It is desirable that the adhesion resistance is nearly 100%.

Impact strength: the sheet prepared using the method of Example 1 was cut to prepare a specimen with 0.5 mm of thickness and 10 cm×14 cm of area. After the specimen was aged for 2 hrs at 25° C., a rpm was measured when 50% of the specimen was broken by rotating a globe saw and being applied to the globe saw at 15 mm/sec rate. The higher the impact strength, it is definitely superior. It is

TABLE 1

| | | | Example | | | Comparative Example | | | | | |
|---|---|---|---|---|---|---|---|---|---|---|---|
| | category | | 1 | 2 | 3 | 1 | 2 | 3 | 4 | 5 | 6 |
| composition | Rubber polymerization | BD | 75 | 75 | 100 | 75 | 75 | 75 | 75 | — | 100 |
| | | SM | 24 | 24 | 0 | 24 | 24 | 24 | 24 | — | 0 |
| | | DVB | 1 | 1 | 0 | 1 | 1 | 1 | 1 | — | 0 |
| | Graft polymerization | rubber | 70 | 70 | 80 | 70 | 70 | 50 | 90 | — | 80 |
| | | MMA | 14 | 14.8 | 19 | 15 | 15 | 24 | 4 | — | 20 |
| | | PEGMA | 1 | 0.2 | 1 | 0 | 0 | 1 | 1 | — | 0 |
| | | SM | 15 | 15 | 0 | 15 | 15 | 25 | 5 | — | 0 |
| | PVC processing | MBS | 7 | 7 | 6 | 7 | 7 | 7 | 7 | 0 | 6 |
| Physical property | Adhesion resistance | (%) | 108 | 114 | 110 | 135 | 132 | 128 | — | 105 | 150 |
| | Impact strength | (RPM) | 750 | 720 | 800 | 550 | 530 | 380 | <200 | <200 | 580 | desirable that the rpm measured is 600 rpm or more.
BD: butadiene,
SM: styrene monomer,
DVB: divinylbenzene

Example 3

<Preparation of Conjugated Diene-Based Rubber Latex>

The same method as Example 1 was used, except that 100 wt % of the butadiene monomer was added when preparing the conjugated diene-based rubber latex in Example 1.

<Preparation of Graft Copolymer Latex>

The same method as Example 1 was used, except that 80 wt % of the conjugated diene-based rubber latex obtained in Example 3 based on the solid was added, 19 wt % of the methylmethacrylate and 1 wt % of the hydroxyl polyethylene glycol methacrylate (PEGMA) were added, and the styrene was not added in Example 1.

<Preparation of PVC Resin Composition Sheet>

The same method as Example 1 was used, except that 6 parts by weight of the graft copolymer powder was added in Example 1.

Comparative Example 6

The Comparative Example 6 was performed by the same method as Example 3, except that 20 wt % of the methylmethacrylate was added, and the hydroxyl polyethylene glycol methacrylate (PEGMA) was not added in Example 3.

As shown in Table 1, it could be confirmed that the PVC composition (Examples 1 to 3) containing the graft copolymer according to the present invention as the impact modifier has an excellent adhesion resistance and impact strength, all together. However, it could be also confirmed that the PVC composition (Comparative Examples 1, 2 and 6) containing the graft copolymer without PEGMA as the impact modifier and the PVC composition (Comparative Examples 3 and 4) containing the graft copolymer being not within the scope of the present invention have both poor adhesion resistance and impact strength.

In addition, it could be confirmed that an adhesion property of PVC composition (Comparative Example 5) without an impact modifier was good, but its impact strength was significantly reduced. When introducing PEG on the graft copolymer latex (Comparative Example 2), there were no effects that the adhesion resistance and impact strength were improved, and when using an excess rubber, i.e., 90 wt % (Comparative Example 4), it could be confirmed that a normal condensation and processing/dispersing were not performed due to the lack of the shell content.

As described above, the present invention has an effect providing a graft copolymer highly improving the adhesion resistance and impact strength, method of preparing the same, and a polyvinyl chloride composition containing the same, in which the polyvinyl chloride composition has excellent adhesion resistance, impact strength, and the like.

What is claimed is:

1. A graft copolymer comprising:
   i) 55 to 85 wt % of a conjugated diene-based rubber core; and
   ii) 15 to 45 wt % of a graft shell surrounding the rubber core, and having a first graft layer comprising a (meth)acrylate-based monomer and at least one selected from the group consisting of a vinyl-based monomer having a polyalkylene oxide group represented by a following Formula 1, and a second graft layer comprising an ethylene-unsaturated aromatic monomer;
   wherein the vinyl-based monomer having the polyalkylene oxide group represented by the following Formula 1 is in the range of 0.1 to 5 wt% based on total weight of all graft copolymer:

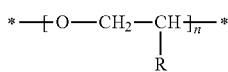
[Formula 1]

wherein R is independently hydrogen or $C_1$ to $C_4$ alkyl group and n is independently 6 to 14, and a number average molecular weight of the vinyl-based monomer is in a range of 200 to 10,000.

2. The graft copolymer of claim 1, wherein the vinyl-based monomer having the polyalkylene oxide group is at least one selected from the group consisting of poly(ethylene glycol) monoacrylate, poly(ethylene glycol) monomethacrylate, poly(propylene glycol) monoacrylate, poly(propylene glycol) monomethacrylate, poly(ethylene glycol) diacrylate, poly(ethylene glycol) dimethacrylate, poly(propylene glycol) diacrylate, poly(propylene glycol) dimethacrylate, methoxy poly(ethylene glycol) monoacrylate, methoxy poly(ethylene glycol) monomethacrylate, methoxy poly(propylene glycol) monoacrylate, methoxy poly(propylene glycol) monomethacrylate, phenoxy poly(ethylene glycol) monoacrylate, and phenoxy poly(ethylene glycol) monomethacrylate.

3. The graft copolymer of claim 1, wherein the conjugated diene-based rubber further comprises an ethylene-unsaturated aromatic monomer.

4. The graft copolymer of claim 1, wherein the conjugated diene-based rubber further comprises a crosslinking monomer.

5. The graft copolymer of claim 1, wherein the (meth)acrylate-based monomer is at least one selected from the group consisting of methyl methacrylate, ethyl methacrylate, butyl methacrylate, methyl acrylate, ethyl acrylate, and butyl acrylate.

6. The graft copolymer of claim 1, wherein the ethylene unsaturated aromatic monomer further comprises up to 40 wt % based on 100 wt % of the graft shell.

7. The graft copolymer of claim 1, wherein the ethylene-unsaturated aromatic monomer is at least one selected from the group consisting of styrene, alpha-methylstyrene, isopropenyl naphthalene, vinyl naphthalene, a $C_1$ to $C_3$ alkyl group-substituted styrene, and a halogen-substituted styrene.

8. The graft copolymer of claim 1, wherein the graft copolymer comprises 55 to 85 wt % of a conjugated diene-based rubber core, 0.1 to 5 wt % of at least one selected from the group consisting of the vinyl-based monomer having the polyalkylene oxide group represented by the Formula 1, and 10 to 44.9 wt % of the (meth)acrylate-based monomer.

9. A method of preparing a graft copolymer, comprising:
   a) polymerizing a conjugated diene-based rubber core;
   b) preparing a graft shell by introducing a (meth)acrylate-based monomer, and at least one selected from the group consisting of a vinyl-based monomer having a polyalkylene oxide group represented by a following Formula 1 to the polymerized rubber core, and then graft-polymerizing; and
   c) additionally polymerizing by introducing an ethylene-unsaturated aromatic monomer after b) step;
   wherein the graft copolymer comprises 55 to 85 wt % of the rubber core, 0.1 to 5 wt % of the vinyl-based monomer having the polyalkylene oxide group represented by the Formula 1, and 10 to 44.9 wt % of the (meth)acrylate-based monomer:

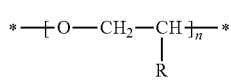
[Formula 1]

wherein R is independently hydrogen, or $C_1$ to $C_4$ alkyl group, n is independently 6 to 14, and a number average molecular weight of the vinyl-based monomer is in a range of 200 to 10,000.

10. An impact modifier for a polyvinyl chloride resin comprising the graft copolymer according to claim 1.

11. A polyvinyl chloride resin composition comprising 80 to 99 wt % of a polyvinyl chloride resin, and 1 to 20 wt % of the graft copolymer according to claim 1.

* * * * *